Jan. 22, 1952 W. O. LYTLE 2,583,000
TRANSPARENT CONDUCTING FILMS
Filed May 14, 1946
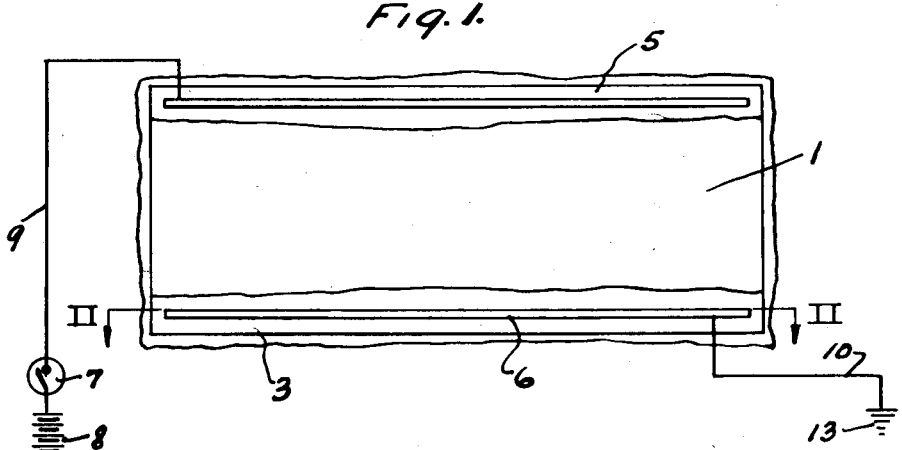
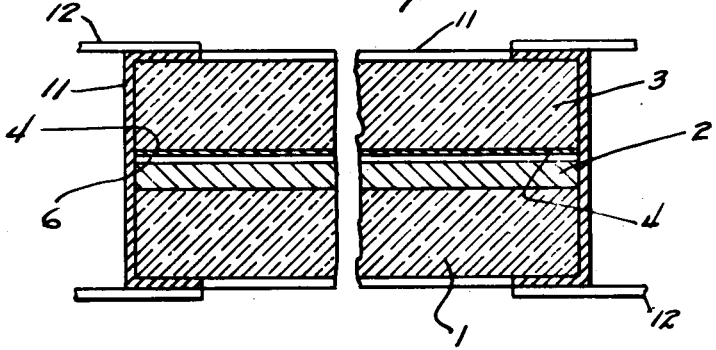
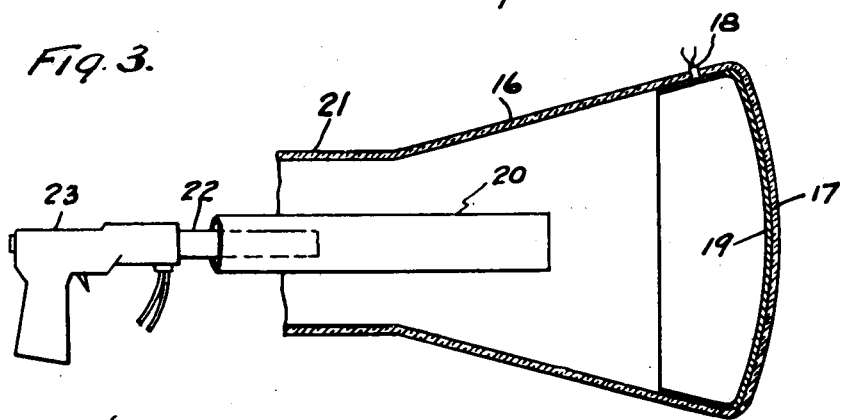
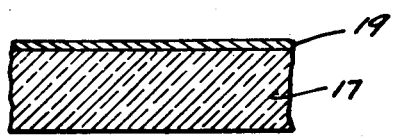
Inventor
WILLIAM O. LYTLE
By Olen E. Bee
Attorney Patented Jan. 22, 1952

2,583,000

UNITED STATES PATENT OFFICE 2,583,000

TRANSPARENT CONDUCTING FILMS

William O. Lytle, New Kensington, Pa., assignor to Pittsburgh Plate Glass Company, Allegheny County, Pa., a corporation of Pennsylvania Application May 14, 1946, Serial No. 669,535

1 Claim. (Cl. 313—92)

This invention relates to transparent electrically conducting films adherent to glass surfaces. More particularly, the invention relates to articles of transparent glass having at least one surface thereof coated with an adherent continuous film of low resistivity and low light dispersion properties and to methods of forming such films on glass surfaces.

Conducting coatings have heretofore been formed on glass surfaces chiefly by cathodic sputtering or by deposition from solution as in silvering. Such coatings are not very adherent and if properly conductive, are usually so thick that in continuous form they interfere with transmission of light.

Littleton, in U. S. Patent No. 2,118,795, has proposed the coating of ceramic insulators by spraying the surface of the hot ceramic body with stannic chloride vapors or with a mist of a water solution of stannous or stannic chloride, or other tin salt. The films so formed have moderately good conductance and they are of such thickness as to produce marked iridescence because of interference colors. Littleton points out that conductivity of the coating formed increases with its thickness, which in turn increases with prolonged or repeated exposure to the fumes of the tin salt or solution.

Littleton's process is described as applicable to the production of "marker" insulators, a field of utility which is not concerned with transmission of visible rays. When attempts are made to form continuous adherent films on transparent glass articles by the Littleton method, it is found that such films as have good transparency and low light dispersion characteristics are not very uniform and have relatively high electrical resistance. When the treatment is prolonged or repeated so that film thickness is increased, the haze or light dispersion factor of the film increases out of all proportion to the improvement in conductivity. Films having a resistivity of 500 ohms or less per square unit of surface area have a haze percentage of 10 or over as measured by a method designated "A Tentative Method of Test for Haze of Transparent Plastics by Photo Electric Cell" described in the publication A. S. T. M. Standards 1944 part 3, pages 1653–5, American Society of Testing Materials, New York. Such high haze values are definitely objectionable and give the same optical effect as a dirty piece of glass.

Haze percentage for coated transparent glass surfaces which are intended for transmission of visible rays should be below 5 per cent and preferably at 2½ per cent or less.

An object of this invention is the production of a transparent glass article having a substantial surface area coated with an adherent continuous transparent film of low electrical resistivity and low haze producing characteristics.

A further object is to provide a glass article having a transparent electroconductive coating thereon which coating is associated with a layer which is visually responsive to electrons.

The achievement of the foregoing objectives will become apparent upon consideration of the following detailed description of the invention and particularly certain specific embodiments thereof as well as embodiments of other inventions.

According to the practice of my invention, I first heat the transparent glass article to be coated to a temperature at or just below the temperature of incipient fusion, which for most glass formulae means a temperature between 1000° F. and 1500° F. When the article to be coated, or more particularly the surface thereof if the article is very thick, has reached approximately the temperature of incipient fusion, I apply to the surface to be coated a coating fluid in the form of a finely divided mist or spray. The coating fluid I employ contains a tin salt or salts, water and a reducing agent. By way of example, stannic chloride pentahydrate, water and phenylhydrazine hydrochloride constitute a particularly desirable coating fluid for use in practicing my invention.

Advantageously, the coating fluid, such as the solution just described, is applied by spraying the solution under air pressure through an atomizer nozzle. On contact with the hot glass surface the mist of coating fluid forms a thin continuous film, the thickness of which can be regulated by the rate at which the coating fluid is applied and by the frequency of application, repeated treatment giving thicker films.

Continuous films of the desired low resistivity and low haze producing characteristics can be readily obtained on any glass surface by suitable regulation of the volume and rate of application of the coating fluid to the area of the surface to be treated.

The precise quantities and rates for application are best determined empirically. By way of illustration, however, I have produced films of desired characteristics on one surface of a piece of 5/64 inch flat plate glass 6 inches square as follows:

*Example I*

Using a solution containing 100 parts by weight fused $SnCl_4 \cdot 5H_2O$, 10 parts by weight H₂O and 2.5 parts by weight phenylhydrazine hydrochloride, 5 ml. of the solution is introduced through a thistle tube into an atomizer of the spray gun type connected to an outlet supplying air under 50 pounds pressure. The plate is placed on a rack having an inclined support which in turn rests on a conveyor. The plate is heated at 1150° F. in an electric furnace for two minutes, fifteen seconds, being then quickly withdrawn and immediately sprayed with the entire contents of the thistle tube, the spraying requiring a trifle less than three seconds. The distance from the spray nozzle to the plate is kept constant at a value between one and two feet. After spraying, the plate is allowed to cool in air until it can be handled after which it is washed with distilled water and polished with a dry cloth. The average resistivity of six plates coated under conditions identical to those above is 371 ohms per square unit of surface area and the average haze percentage measured by the A. S. T. M. method described above is 1.3.

For purposes of comparison with the prior art, plates of the same thickness and dimensions were treated under identical conditions excepting that the coating fluid employed contained 100 parts fused $SnCl_4.5H_2O$, 1.67 parts $H_2O$ and no reducing agent. With seven plates so treated the average resistivity was 907 ohms per square unit of surface area and the average haze percentage 1.1.

When plates are coated wtih more than one application of the coating fluid containing phenylhydrazine hydrochloride or another equivalent reducing agent according to my invention, the resistivity of the film is further diminished considerably while the average haze percentage is not increased to an objectionable point. For instance, when two coatings of 5 ml. each were applied to plates in the manner described above in connection with Example I the average resistivity of the plates was reduced to 132 ohms per square unit of surface area while the average haze percentage increased only to 2.1, a quite acceptable figure.

On the other hand, when the coating fluid is of the Littleton type in which no reducing agent is incorporated, 5 coatings of 5 ml. each were required to bring the resistivity down to 575 ohms with the result that the haze percentage was increased to 10.1. This is greatly in excess of an acceptable figure for closures glazed for viewing purposes.

In practicing my invention, I can use coating fluids containing tin salts other than the tetrachloride pentahydrate. The anhydrous tetrachloride can be used and likewise the other stannic halides such as the bromide, and iodide. If desired, the water in the coating fluid can be replaced in whole or in part by an aliphatic alcohol such as methanol and ethanol.

I regard the presence of an organic reducing agent in the coating fluid or solution as essential. Best results have been obtained with phenylhydrazine hydrochloride as above indicated, but other organic reducing agents such as formaldehyde, glyoxal, trioxane, and the like have been successfully employed.

The coatings produced by the method of the invention are stable and maintain their conductivity well under normal conditions. Even prolonged heating at temperatures up to 400° F. does not appear to adversely affect the conductivity of the films. When the films are heated for prolonged intervals at temperatures above 450° F., the resistivity gradually increases appreciably. It is quite significant, however, that the film is resistant to deterioration under conditions such that the coated glass article is rapidly heated to temperatures as high as 1500° F. and then cooled in air. Thus, articles of glass on which adherent conducting coatings have been formed according to the practice of my invention can be subjected to temperatures between 1000° F. and 1500° F. for intervals up to eight or ten minutes and rapidly or gradually cooled in air without appreciable loss in conductivity.

In many instances it is advantageous to provide a non-conducting, transparent coating directly over the conducting film of the invention which in turn adheres to the glass surface. In certain applications of the invention such a non-conducting coating shields the conductive film from contact with external forces which may tend to impair the conductivity thereof or which, on the other hand, may be harmed by contact with the conductive film when it is at a potential differing from the ground.

In certain specific embodiments of the invention a single transparent glass panel coated with a conductive film is employed as a heating element and there is risk of the element being contacted by human beings. In such instances, for example in portable room heaters or in windows for autos and other vehicles, when the voltage is made sufficient to span an appreciable distance between electrode terminals, the conductive film of the invention may be at sufficient potential to give an appreciable shock. When a non-conductive coating is applied over the exposed surface of the conductive film, the appliance is rendered safe.

An additional advantage may be obtained in the employment of non-conductive coatings in conjunction with the conductive coatings above described. Thus, the conductive coatings of the invention when thin enough to avoid excessive haze are in the range of thickness which inherently produces iridescence. Where two-way vision is desired through a viewing closure, such iridescence can be an annoying factor since it is particularly noticeable in reflected light. According to a preferred embodiment of my invention, a conductive film produced as above described is further coated with a non-conductive film having an index of refraction approximately the same as the conductive coating and of such thickness as to build up the combined film on the glass surface to a point where it is no longer iridescent.

In forming non-conductive films over the conducting films heretofore described, I reheat the conductively coated glass surface to a temperature between 1000 and 1500° F., for example 1150° F., and spray the conductive surface with a coating fluid whch will yield a non-conductive, abrasion-resistant film. By way of example, I have produced non-conductive coatings over the conductive coatings heretofore described by employing apparatus similar to that described in Example I and spraying the heated conductive surface with a 5 per cent solution of aluminum chloride in water after which the coated glass panel was allowed to cool. When 5 ml. of a solution of aluminum chloride is so applied, the exposed surface is rendered non-conductive, but the combined film formed is not sufficiently thick to avoid iridescence under reflected light. However, by repeated or continued application of the non-conductive film forming fluid, the film can be rendered sufficiently thick to cause the iridescence to disappear entirely.

Various siliceous solutions form excellent coating fluids for the production of non-conductive films. Thus, I have successfully employed a hydrolyzed silica sol formed by peptizing ethyl silicate in aqueous solution by the addition of HCl. Sols formed from other organic silicates or the poly-silicates are equally suitable. On application under the conditions above recited such siliceous solutions form hard, abrasion resistant, transparent, non-conductive films. Likewise, organic silicates can be applied to cold surfaces and then fired to increase their stability. Solutions of silicon, titanium and iron chlorides can be used under controlled conditions as coating solutions to form non-conductive films in the manner above described.

Non-conducting films having an index of refraction less than the conducting coatings can be applied to reduce reflection from the surface while at the same time diminishing the iridescence.

In the accompanying drawings I have illustrated, more or less diagrammatically, certain specific embodiments of the invention. In the drawings, Fig. 1 is an elevation partly broken away illustrating a laminated heating panel adapted for use in windows, windshields, and the like;

Fig. 2 is a fragmentary horizontal section, greatly enlarged, taken substantially along the lines II—II of Fig. 1, but showing additional structure in detail;

Fig. 3 is a diagrammatic representation, partly in section and partly in elevation, illustrating application of the conductive coating of my invention to the inside of an electron tube of conventional character and further illustrating apparatus and technique useful in producing such coating; and Fig. 4 is a greatly enlarged section showing formation of the conductive film on the surface of the glass as produced on the tube shown in Fig. 3.

Referring to the drawings, and more particularly to Figs. 1 and 2, there is illustrated a safety glass viewing panel embodying the continuous conductive coating of the invention and adapted for employment as a self-defrosting auto windshield. The panel consists of a transparent inner pane of sheet glass 1 joined through a transparent plastic interlayer 2 to a transparent outer pane, indicated generally at 3. The pane 3 is coated on the inner surface adjacent the interlayer 2 with an adherent transparent continuous conducting coating 4 formed thereon by application of a tin salt-containing coating fluid according to the method of the invention. At the top and bottom of the inner surface of the pane 3 are silver bus bars 5 and 6 respectively, each in electrical adherent contact with conducting coating 4 throughout its length. As shown diagrammatically in Fig. 1, the bars 5 and 6 serve as electrodes which can be connected through a switch 7 to opposite poles of a source of electrical current 8 by means of leads 9 and 10. Fig. 2 shows details of conventional windshield mounting elements. In the structure illustrated a yieldable grommet 11 of rubber or other plastic insulating material is interposed between the windshield and the metal mounting frame 12.

The source of current 8 may be a battery or generator and usually one of the connections is made through a common ground 13 such as the frame of the car.

The bars 5 and 6 are formed on the inner surface of the pane 3 as follows. In forming the pane with the conductive film, the glass sheet is heated to 1150° F. as above described and sprayed over its entire surface with a coating fluid, preferably of the formula given in Example I above. After cooling, a paste of silver particles suspended in a silver flux is applied where the bus bars are to be located. Usually, in windshields this takes the form of a thin strip approximately ¼ inch to $\frac{3}{8}$ inch wide. The strips may be formed on the surface at the edge or slightly set back from the edge of the glass.

After application of the silver paste, the pane is returned to the furnace and fire at a temperature of 1050° F. to 1100° F. for a few minutes until the paste is converted into a metallic strip adherent to the conducting coating 4. Sometimes the firing of the bus bars lowers the conductivity of the conductive film slightly and in such instances the entire inner surface of the pane 3 may again be treated while hot by application of another coating of conductive material as above described.

When it is desired to apply merely one coat of conducting material, the silver paste can be applied to the cold surface and fired, the conducting coating being sprayed on while the surface is still hot.

The lamination of the panes 1 and 3 with the interlayer 2 is accomplished by conventional methods, the vinyl interlayer adhering excellently to the coated pane 3.

Fig. 3 illustrates diagrammatically a useful application of the method of the invention in forming conductive coatings on the inner surface of electronic tubes, such as the conventional cathode ray tubes. There is shown a transparent glass envelope 16 of conventional flared shape terminating in a flattened transparent portion 17 which in ultimate use is to be provided with a layer (not shown) of a substance which is visually responsive to the impingement of electrons, thus forming a viewing screen in a manner well known in the art. It has been found that in use, tubes of this character often suffer a build-up of an electrostatic charge in the vicinity of the screen, which charge impairs the clarity of the image produced by the tube mechanism. To avoid this difficulty, it is desirable to form a transparent conductive coating between the glass of the envelope and the layer of electron-responsive material. This coating can be grounded, thus serving to remove any electrostatic charge which would otherwise tend to accumulate. Conventionally, a button 18, of conductive material, is sealed in the glass of the envelope during fabrication and serves as an electrical connection or lead from the interior to the exterior of the envelope.

The transparent conductive coatings of my invention are ideally suited for application to tubes of this character and in practice tubes coated in accordance with the invention have shown performance characteristics not matched by other coatings.

In applying my conductive coating to tubes of the character described, I prefer to mask so much of the interior of the tube as is to be left uncoated. This can be accomplished by well-known means. Thereafter, the tube is heated to a temperature within the range above indicated. For tubes of the glass conventionally employed, I prefer to heat the envelope in an electric furnace maintained at a temperature of 1150° F. for a period of two to three minutes. Immediately on withdrawal from the furnace, the tube is sprayed with about 5 ml. of a coating fluid containing a tin-salt and a reducing agent according to the invention as described above. Best results so far have been obtained with a solution containing stannic chloride pentahydrate, phenylhydrazine hydrochloride and water as described in Example I above. A conductive film is formed on the interior of the tube. In the drawing, such a film is shown very much enlarged as at 19 in Figs. 3 and 4.

In Fig. 3, there is diagrammatically shown certain apparatus which can be employed advantageously in coating tubes. An element 20 is a cylindrical tube of outside diameter less than the open neck 21 of the tube to be coated. In practice the tube 20 is inserted in the open neck of the tube and maintained in concentric relationship therewith by any convenient supporting means, not shown.

With the tube 20 projecting well into the interior of the tube and extending out through the open neck 21, the coating fluid of the invention can then be applied to the tube interior by introducing the nozzle 22 of a spray gun 23 or other suitable atomizing apparatus into the tube 20. With the arrangement described so much of the tube interior as is not masked is coated with the uniform adherent transparent continuous conducting coating 19. In Fig. 3, for example, the coating 19 is shown extending entirely over the flattened end 17 and down the flared sides to a point about one inch below the button 18. During application of the conducting coating the button 18 is covered therewith affording an electric connection on the tube exterior.

While the present invention has been described with reference to specific details of certain embodiments, such details should not be regarded as imposing limitations upon the scope of the invention except insofar as imposed by the accompanying claim.

I claim:

In an electron tube having an envelope enclosing a transparent glass end portion and a layer which is visually responsive to impingement of electrons for production of an image on the interior of said end portion, the combination of a transparent electroconductive continuous tin oxide coating on said envelope and interposed between said end portion and said layer, said tin oxide coating having a resistance less than 500 ohms per unit square and a haze factor below 5% and being in electrical contact with said responsive layer.

WILLIAM O. LYTLE.

REFERENCES CITED

The following references are of record in the file of this patent:

UNITED STATES PATENTS

| Number | Name | Date |
| --- | --- | --- |
| 1,803,787 | Bour | May 5, 1931 |
| 2,021,661 | Kisfaludy | Nov. 19, 1935 |
| 2,029,639 | Schlesinger | Feb. 4, 1936 |
| 2,090,922 | Ardenne | Aug. 24, 1937 |
| 2,093,699 | Varian et al. | Sept. 21, 1937 |
| 2,118,795 | Littleton | May 24, 1938 |
| 2,197,625 | Teves et al. | Apr. 16, 1940 |
| 2,224,324 | Van Steenis | Dec. 10, 1940 |
| 2,293,822 | Haven | Aug. 25, 1942 |
| 2,367,903 | Trevail et al. | Jan. 23, 1945 |
| 2,401,537 | Adams | June 4, 1946 |
| 2,429,420 | McMaster | Oct. 21, 1947 |
| 2,449,752 | Ross | Sept. 21, 1948 |
| 2,472,988 | Rosenthal | June 14, 1949 |